United States Patent
Laing et al.

(10) Patent No.: US 11,783,573 B2
(45) Date of Patent: Oct. 10, 2023

(54) CONTEXTUAL INFORMATION DISPLAYABLE ON WEARABLE DEVICES BASED ON IMAGES CAPTURED DURING WELLSITE OPERATIONS

(71) Applicant: Halliburton Energy Services, Inc., Houston, TX (US)

(72) Inventors: Moray Lamond Laing, Spring, TX (US); Mukesh Kapila, Houston, TX (US); Kathleen Mary Hall, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 264 days.

(21) Appl. No.: 17/128,690

(22) Filed: Dec. 21, 2020

(65) Prior Publication Data

US 2022/0198192 A1  Jun. 23, 2022

(51) Int. Cl.
  *G06V 20/10* (2022.01)
  *E21B 47/002* (2012.01)
  (Continued)

(52) U.S. Cl.
  CPC ............ *G06V 20/10* (2022.01); *E21B 47/002* (2020.05); *G02B 27/0093* (2013.01);
  (Continued)

(58) Field of Classification Search
  CPC .... G06V 20/10; G06V 10/768; E21B 47/002; G02B 27/0093; G02B 27/0172; G02B 2027/0138; G06F 3/013
  (Continued)

(56) References Cited

U.S. PATENT DOCUMENTS 9,317,113 B1    4/2016  Karakotsios
2015/0149092 A1 5/2015  Hancher et al.
(Continued)

FOREIGN PATENT DOCUMENTS

CN    203321491 U    12/2013
JP    2019040227 A   3/2019
(Continued)

OTHER PUBLICATIONS

PCT Application No. PCT/US2020/066512, International Search Report, dated Sep. 16, 2021, 3 pages.
(Continued)

*Primary Examiner* — Gabriel I Garcia
(74) *Attorney, Agent, or Firm* — Delizio, Peacock, Lewin & Guerra (57) ABSTRACT

A method includes receiving an image that includes a wellbore component used during a wellbore operation of a borehole at a wellsite captured by a camera at the wellsite and inputting the image into an image recognition model. The method includes outputting, from the image recognition model, a class representing the wellbore component and inputting the class into a context model. The method includes outputting, from the context model, contextual data related to the wellbore component based on, the class representing the wellbore component, contextual data relating to the wellbore operation, and a type of the wellbore operation. The method includes transmitting the contextual data to a wearable device worn by a user at the wellsite.

20 Claims, 7 Drawing Sheets

(51) Int. Cl.
* G02B 27/00 (2006.01)
* G02B 27/01 (2006.01)
* G06F 3/01 (2006.01)
* G06V 10/70 (2022.01)

(52) U.S. Cl.
CPC ......... *G02B 27/0172* (2013.01); *G06F 3/013* (2013.01); *G06V 10/768* (2022.01); *G02B 2027/0138* (2013.01)

(58) Field of Classification Search
USPC .................................................. 382/181
See application file for complete search history.

(56) References Cited

U.S. PATENT DOCUMENTS

| | | | |
|---|---|---|---|
| 2017/0152729 A1* | 6/2017 | Gleitman | E21B 44/00 |
| 2018/0357594 A1 | 12/2018 | Rabibadhana | |
| 2019/0236368 A1 | 8/2019 | Murata | |
| 2020/0190963 A1* | 6/2020 | Gooneratne | E21B 17/02 |
| 2021/0174486 A1* | 6/2021 | Chowhan | G06K 9/6288 |
| 2021/0301642 A1* | 9/2021 | Wicks | E21B 44/04 |
| 2021/0319894 A1* | 10/2021 | Sobol | G16H 40/67 |

FOREIGN PATENT DOCUMENTS

| | | |
|---|---|---|
| WO | 2019087213 A1 | 5/2019 |
| WO | 2020162885 A1 | 8/2020 |

OTHER PUBLICATIONS

PCT Application No. PCT/US2020/066512, Written Opinion, dated Sep. 16, 2021, 4 pages.

Bartram, et al., "Future Vision: The Next Revolution in Production Operations", Offshore Technology Conference, May 4-7, 2009, Houston, Texas, 11 pages.

Clarke, et al., "AR and VR Applications Improve Engineering Collaboration, Personnel Optimization, and Equipment Accuracy for Separation Solutions", Society of Petroleum Engineers, SPE Offshore Europe Conference and Exhibition, Sep. 3-6, 2019, Aberdeen, UK, 6 pages.

Colombo, et al., "Virtual Reality as Effective Tool for Training and Decision Making: Preliminary Results of Experiments Performed with a Plant Simulator", Society of Petroleum Engineers, European HSE Conference and Exhibition, Apr. 16-18, 2013, London, United Kingdom, 12 pages.

Daglas, et al., "The Use of Virtual Reality and PLM Technologies to Support Upstream and Downstream Offshore Asset Management", Offshore Technology Conference, Apr. 30-May 3, 2012, Houston, Texas, USA, 4 pages.

Helm, et al., "Enabling Collaborative Decision Making Through Immersive Visualisation", Society of Petroleum Engineers, SPE Annual Technical Conference and Exhibition, Sep. 24-26, 2018, Dallas, Texas, USA, 13 pages.

Jacobs, "AR Headsets Give Oil and Gas the Quicker Fix", Society of Petroleum Engineers, Journal of Petroleum Technology, vol. 70, Iss. 07, Jul. 2018, 3 pages.

Kapila, "Unique application of digital technologies improves operational efficiency", World Oil, vol. 241, No. 4, Apr. 2020, retrieved from https://www.worldoil.com/magazine/2020/april-2020/special-focus/unique-application-of-digital-technologies-improves-operational-efficiency, 6 pages.

Kulkarni, et al., "Applications of Mixed Reality in Process Safety and Operational Integrity", Society of Petroleum Engineers, SPE International Conference and Exhibition on Health, Safety, Security, Environment, and Social Responsibility, Apr. 16-18, 2018, Abu Dhabi, UAE, 6 pages.

Potts, et al., "Enhanced Augmented/Mixed Reality and Process Safety Applications", Society of Petroleum Engineers, SPE International Conference and Exhibition on Health, Safety, Environment, and Sustainability, Jul. 27-31, 2020, Virtual, 9 pages.

Pray, et al., "Integration of Wearable Technology for Inspection Tasks", Offshore Technology Conference, Apr. 30-May 3, 2018, Houston, Texas, USA, 11 pages.

Redding, et al., "Remote Assistance & Guided Work Instructions Improving Productivity with Smart Glasses at Schlumberger", Screen captures from YouTube video clip entitled "Improving Productivity with Smart Glasses | EWTS 2019," 18 pages, uploaded on Mar. 20, 2020 by user "BrainXchange". Retrieved from Internet: <https://www.youtube.com/watch?v=d3l85_T1Mag>.

Stephen, et al., "Augmented and Virtual Reality Applications for Separation Solutions Improve Service Provider-Operator Collaboration and Technology Placement", Society of Petroleum Engineers, Abu Dhabi International Petroleum Exhibition & Conference, Nov. 11-14, 2019, Abu Dhabi, UAE, 5 pages.

\* cited by examiner

CONTEXTUAL INFORMATION DISPLAYABLE ON WEARABLE DEVICES BASED ON IMAGES CAPTURED DURING WELLSITE OPERATIONS

TECHNICAL FIELD

The disclosure generally relates wellsite operations as part of operations for hydrocarbon recovery operations from a wellbore and more particularly to providing contextual information displayable on wearable devices based on images captured during wellsite operations.

BACKGROUND

With increased levels of automation and digitalization of wellsite operations for hydrocarbon recovery, a human operator monitoring a wellsite can spend less time in front of a control system and more time onsite monitoring at the wellsite during wellbore operations.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to heads-up display systems in illustrative examples. Embodiments of this disclosure can be also applied to other types of display systems, wearable or non-wearable. In other instances, well-known instruction instances, protocols, structures, and techniques have not been shown in detail in order not to obfuscate the description.

Because human operators can now be physically onsite to monitor wellsite operations instead of in front of a control system, these operators may not have real-time information available to them as they move around the wellsite. In some implementations, wearable head-mounted and heads-up display systems can provide operators with information that was previously accessible from a control room, enabling them to both move freely about the operational site and access information relating to the wellsite, a wellbore operation, or equipment at the wellsite without returning to a control system at a fixed location on site.

Wearable devices can include viewable displays that can connect wirelessly to data acquisition systems and be configured to receive information and display the information to the operator on a display (e.g., transparent display). For example, the information can be superimposed over a view of a user's surrounding environment. This enables the user to view the information presented by the display simultaneously with their surroundings without blocking their field of vision.

Monitoring a wellbore operation can include monitoring sensor feedback, comparing real-time measurements with expected measurements generated by models, evaluating an efficiency of a piece of equipment involved in the wellbore operation, and other monitoring or analysis relating to the wellbore operation. For a given wellbore operation, a large amount of data can be generated. The amount of data generated can be so large that it would be inefficient, or even nearly impossible, for an operator monitoring the wellbore operation to sift through all of the generated data to determine whether there is a problem or inefficiency while the wellbore operation is occurring. A wearable device can enable the operator to move around a wellsite and access operational information remotely through the wearable device. Operation of the wearable device can be multimodal. For example, a first mode can be a user-controlled mode, where the operator can issue a command requesting specified information. A second mode can be a live mode, where images from the operator's real-time field of view can be processed real-time to determine what information to provide to the operator. A third mode can be an inventory mode, where images of inventory can be processed real-time to determine whether there is a sufficient quantity of the inventory to perform a planned wellbore operation.

In the user-controlled mode, a natural language processing model can receive and categorize a verbal command issued by the operator from the wearable device to output a class of information for the verbal command. The class can then be input to a context model. The context model can output contextual data based on various criteria including the class of the verbal command, sensor data from the wellsite, a type of wellbore operation, etc.

In the live mode, an image recognition model can receive an image from the wearable device, identify a wellbore component in the image, and categorize the wellbore component to output a class of information for the wellbore component. The class can then be input into the context model to output relevant contextual data based on the wellbore operation.

In some embodiments, relevant contextual data can be derived from an image of inventory at the wellsite. For example, in the inventory mode, the image recognition model can process the image and perform a volumetric analysis to output a quantity of the inventory. The context model can then determine whether the quantity of the inventory is sufficient to complete a wellbore operation based on the quantity of the inventory from the image, inventory logs, and the wellbore operation.

Example System

Figure 1:
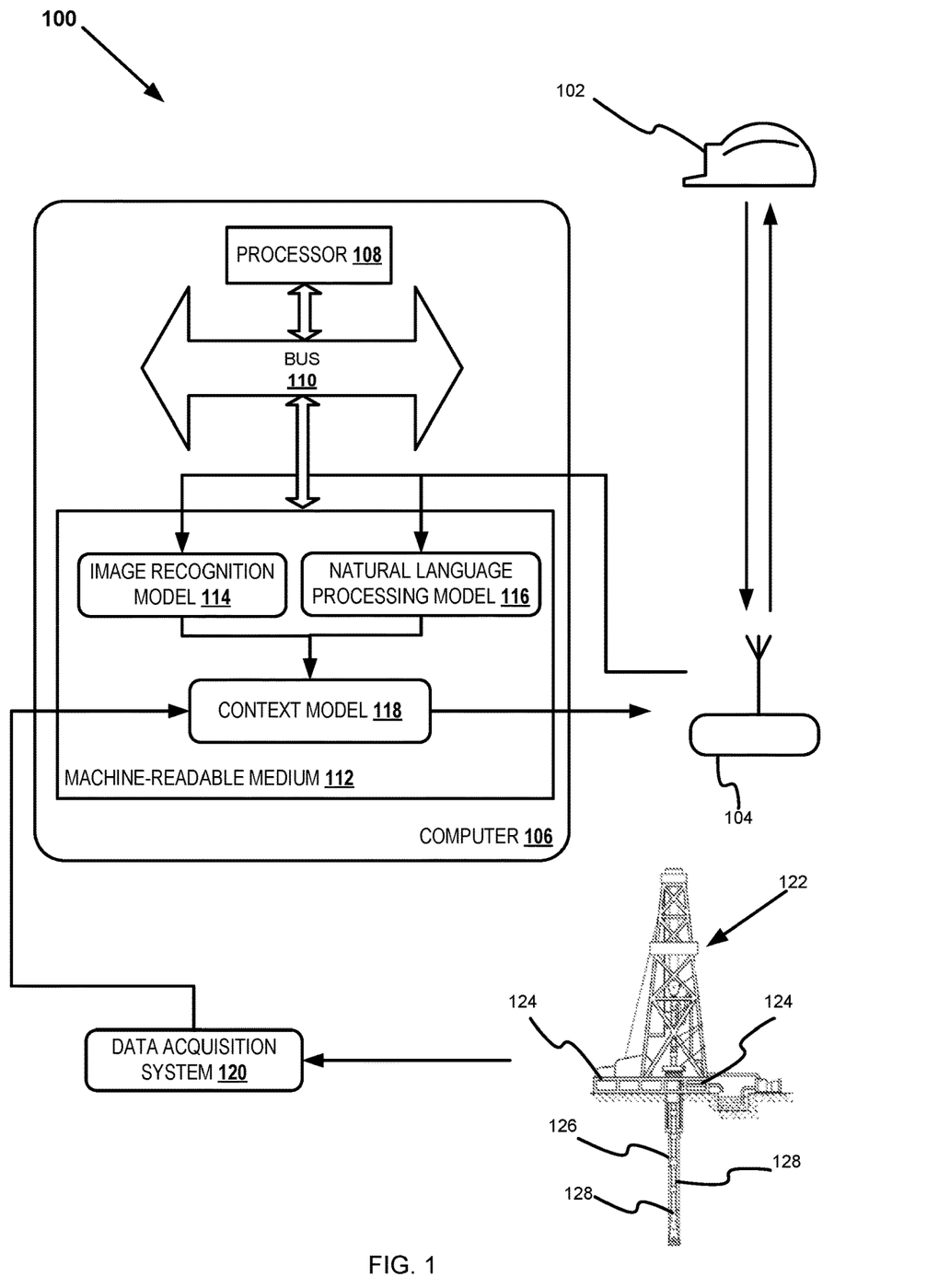
FIG. 1 depicts an example system having a wearable device for use on a wellsite, according to some embodiments.

FIG. 1 depicts an example system having a wearable device for use on a wellsite, according to some embodiments. Tasks performed by operators on a wellsite can include monitoring a wellbore operation, maintaining equipment, and responding to emergencies on site. Oftentimes operators are moving around the wellsite between tasks. Wearable devices can allow operators to access real-time data relating to the wellbore operation as they move about the wellsite without being physically tethered to monitor and control systems.

Large amounts of data can be generated by sensors, models, and other analytical means for a wellbore operation. The quantity of data can make it nearly impossible for an operator to analyze and interpret all of the data in real-time. Machine-learning enabled data processing systems can process and analyze the large amounts of data generated by the wellbore operation in real-time and identify relevant contextual data to relay to an operator wirelessly as they move about the wellsite.

With reference to FIG. 1, an example system 100 for providing contextual data for a wellbore operation to a user can include a wearable device 102. The wearable device 102 can include a microphone, a camera, a transparent display in the user's field of vision, depth sensors, and speakers. A wireless router 104 can provide for wireless communications between the wearable device 102 and a computer 106. For example, the wireless router 104 can transmit images, audio, location data, and other sensing data from the wearable device 102 to the computer 106. The computer 106 can include a processor 108, a bus 110, and a machine-readable medium 112.

A data acquisition system 120 can collect data from sensors at a wellsite 122. The sensors can include sensors 124 at a surface of the wellsite 122. For example, the sensors 124 can be sensors to measure different characteristics of a fluid being delivered downhole into a borehole 126. This can include pressure, temperature, flow rate, etc. The sensors can include downhole sensors 128. For example, the downhole sensors 128 can measure different characteristics of operations downhole. This can include pressure and temperature downhole at different depths. There can also be sensors at different depths within the borehole 126 to measure a flow rate of a fluid being delivered downhole and a fluid returning to the surface. For example, the downhole sensors 128 can be flow meters to measure a flow rate of a cementing slurry for a cementing operation in the borehole 126. The sensors 124, 128 can be pressure sensors, temperature sensors, flowmeters, acoustic sensors, densitometers, optical sensors, or any other sensors or combinations of sensors used to collect data at the surface or downhole during a wellbore operation.

The wearable device 102 can be multimodal and can operate in a user-controlled mode, a live mode, and an inventory mode. In the user-controlled mode, the user or operator wearing the wearable device 102 can issue a verbal command requesting specified information relating to the wellbore operation, wellsite equipment, or inventory through the microphone of the wearable device 102. Audio of the verbal command can be transmitted via the wireless router 104 to the computer 106. The audio can then be input into a natural language processing ("NLP") model 116. The NLP model 116 can perform speech segmentation and speech recognition of the audio of the verbal command to convert the audio to text. The NLP model 116 can then parse and analyze the text of the command to output a class representing the requested information of the command. The class can represent a specific wellbore component. For example, the NLP model 116 can output the class "pump" for an input command requesting information about a pump used in a wellbore operation. In some embodiments, the class can represent a category of audio data. For example, the NLP model 116 can output the class "hydraulics" for an input command requesting formation about downhole pressure during a cementing operation.

The NLP model 116 can be a machine-learning model. In some embodiments, the NLP model 116 can be composed of an audio recognition model, a semantic similarity model, and a classification model. In other embodiments, the NLP model 116 can be an end-to-end automatic speech recognition model. The NLP model 116 can be any natural language processing model employing speech recognition methods.

The class representing the requested information of the verbal command can be input into a context model 118. The context model 118 can output contextual data based on data collected by the data acquisition system 120 from the sensors 124 and 128 at the wellsite 122, the class for the requested information of the verbal command, and a type of the wellbore operation. Contextual data is data relating to the requested information that is selected based on contextual information for the wellbore operation. Contextual information for the wellbore operation can include the type of the wellbore operation. For example, the type of the wellbore operation can be a cementing operation. Contextual information for the wellbore operation can include real-time data from the wellbore operation. For example, downhole pressure sensors indicating an equivalent circulating density within a pore pressure and a fracture gradient of a formation can be contextual information for a cementing operation. Contextual information for the wellbore operation can be models for the wellbore operation. For example, for a cementing operation, hydraulic models can be contextual information for the wellbore operation. For a drilling operation, formation models can be contextual information for the wellbore operation. Contextual information for the wellbore operation can include operational parameters. For example, for a drilling operation, contextual information can include a rate-of-penetration, a rotations-per-minute for a drill bit, a weight on bit, etc. Contextual information for the wellbore operation can include fluid characteristics. For example, for a hydraulic fracturing operation, contextual information can include fluid rheology for a fracturing fluid.

Contextual data can be raw data, unstructured data, interpreted data, or derived information describing a state or status of the wellbore operation or components used in the wellbore operation. Contextual data can include sensor data. For example, for the class "pump", the contextual data can include a stroke rate, a pressure, a flow rate, or any other sensor data relating to pump operations. Contextual data can include warnings of equipment malfunction. For example, if a pump is operating below a desired efficiency, the contextual data can include a notice that the pump may not be operating correctly. Contextual data can be derived from sensor data, model data, formation information, or any other source of information relating to the wellbore operation. Contextual data can include information generally relating to a current stage of the wellbore operation. For example, if an operator requests information about a current status for a drilling operation, the contextual data can include information that a drill bit of a drill string is approaching a new formation type and that vibration in the top drive is expected at a current rotations-per-minute of the drill string.

The context model 118 can be a machine-learning model. For example, the context model 118 can cluster data from the wellbore operation where each data cluster is classified based on shared properties of the data within the cluster. For example, a data cluster with the class "pump" can include sensor data (flow rate, pressure, stroke rate, etc.) for a pump, an equivalent circulating density of a fluid introduced into a wellbore by the pump, fluid rheology for the fluid circulated by the pump, standard operating procedures for pump maintenance, pump operating efficiency models, or any other data relating to the pump. The context model 118 can cluster data using a clustering algorithm. For example, the clustering algorithm can be a K-means clustering algorithm, a hierarchical clustering algorithm, or another clustering algorithm known to those skilled in the art.

The context model 118 can identify a data cluster corresponding to the class representing the requested information of the verbal command output from the NLP model 116. Based on the sensor data from the wellbore operation and the type of wellbore operation, the context model 118 can output the contextual data relating to the requested information of the verbal command. The contextual data can include data from the data cluster corresponding to the class representing the requested information. For example, for an input class "pump," the context model 118 can identify the data cluster with the class "pump" and output contextual data from that data cluster. The context model 118 can select, analyze, derive, or interpret data from the data cluster based on the wellbore operation. For example, if the wellbore operation is a cementing operation and the operator requests information relating to a pump, the context model 118 can output live ECD data from the data cluster having the class "pump".

The context model 118 can output contextual data based on surface, sub-surface, and unstructured data associated with the wellbore operation. For example, the contextual data can be based on streaming data from sensors, standard operating procedures, planned activities from a well plan, semantic information describing capabilities for a piece of equipment, sub-surface geological formation data, geomechanical data, supply chain information, inventory data, a location of the user on the wellsite 122, hydraulic models, etc. The contextual data can be based on one or more of the aforementioned data associated with the wellbore operation.

In some embodiments, the context model 118 can output contextual data based on an analysis of the surface, sub-surface, and unstructured data associated with the wellbore operation. The context model 118 can include a machine-learning model, which can classify data, and an operational model, which can evaluate classified data of the machine-learning model based on a set of rules. For example, the context model 118 can classify data from pressure sensors, flowmeters, and viscometers as "hydraulic" data. The context model 118 can compare sensor data collected by the data acquisition system 120 with predicted values of one or more models for the wellbore operation and calculate an efficiency of a system of the wellbore operation. For example, the context model 118 can determine that a pump is operating at 70% efficiency based on the class of "hydraulic" data. The context model 118 can compare the calculated operating efficiency to an expected operating efficiency and identify potential causes based on the sensor data. For example, the context model 118 can compare the calculated 70% operating efficiency to an expected operating efficiency of 80% as determined by a pump efficiency model. The context model 118 can then determine that there may be a potential for washout based on a measured stroke rate that is inconsistent with a measured flow rate and can include this information in the output contextual data. The contextual data can then be transmitted back to the wearable device 102 and displayed on the transparent display in the user's field of view.

The user can switch the wearable device 102 from the user-controlled mode to the live mode. For example, the user can switch using any type of input, such as a voice command, a button selection, etc. In the live mode, a camera of the wearable device 102 can transmit images in real-time to the computer 106 for image processing. Alternatively or in addition, images can be transmitted to the computer 106 from fixed cameras at the wellsite 122, drones, or a mobile device such as a cellphone or a ruggedized portable tablet. The computer 106 can receive an image of a wellbore component from the wearable device 102 or another camera. The wellbore component can be wellbore equipment used during the wellbore operation. For example, the wellbore component can be a pump. The image can be input into an image recognition model 114 for image processing. The image recognition model 114 can locate the wellbore component in the image with a bounding box, as described below in reference to FIG. 4. The image recognition model 114 can perform object detection on the image to identify the wellbore component in the image and assign a class representing the wellbore component. The class representing the wellbore component is an identifier for the wellbore component. For example, the image recognition model 114 can output the class "pump" for an input image of a pump. As a second example, for an input image of the operator's field of view taken by a camera of the wearable device 102, where the operator is looking at a top-drive, the image recognition model 114 can output the class "top-drive". The image recognition model 114 can output the class representing the wellbore component for input into the context model 118.

In some embodiments, the wearable device 102 can include a second camera facing the user's face and can transmit images of the user's face or eyes to the computer 106 for tracking the user's gaze. The image of the user's face can be an input to the image recognition model 114. The image recognition model 114 can determine where the user is looking. In some embodiments, the image recognition model 114 can identify the wellbore component in the image based on the user's gaze. For example, if multiple wellbore components are present in the image, the image recognition model 114 can determine which of the wellbore components the user is looking at based on the user's gaze and can output the class of that wellbore component. Alternatively, the wearable device 102 can include a gaze-tracking system to track the user's gaze and the image recognition model can identify which wellbore component the user is looking at in an image having multiple wellbore components present based on data from the gaze-tracking system.

The image recognition model 114 can be a machine-learning model trained on labeled visual data from other drilling operations. For example, the image recognition model 114 can be a convolutional neural network. The image recognition model 114 can create classes based on a library of images. The image recognition model 114 can then assign one of the created classes to the wellbore component of the image. The classes correspond to the wellbore component. For example, the image recognition model can output "pump" as the class for an input image of a pump. Other example classes of wellbore components at the surface can include engine, rotary table, shaker, tubing, pipes, etc.

The class representing the wellbore component can be input into the context model 118. The context model 118 can output contextual data based on one or more of 1) data collected by the data acquisition system 120 from the sensors 124 and 128 at the wellsite 122, 2) the class for the wellbore component, and 3) the type of the wellbore operation. The contextual data can then be transmitted back to the wearable device 102 and displayed on the transparent display in the user's field of view. In some embodiments, the contextual data can be relayed to the user as audio using a speaker of the wearable device 102.

In some embodiments, the wearable device 102 can operate in the inventory mode, as described below in reference to FIG. 5. The inventory mode can be activated when the wellbore component of the image transmitted by the wearable device 102 is an inventory item for use in a planned wellbore operation. For example, the wearable device 102 can transmit an image of sacks of barite on a pallet to the computer 106. In the inventory mode, the image of the inventory item can be input into the image recognition model 114. The image recognition model 114 can perform object recognition and volumetric analysis on the image to determine, respectively, the class of the inventory item and a quantity of the inventory item. The image recognition model 114 can output the class and the quantity of the inventory item.

The class and the quantity of the inventory item can be input into the context model 118. The context model 118 can determine whether the quantity of the inventory item is sufficient to complete a planned wellbore operation based on the class of the inventory item, the quantity of the inventory item, a type of the planned wellbore operation, and inventory data. Inventory data can include supply chain information, quantities of inventory in storage, etc. For example, the inventory data can include a quantity of an inventory item located off the wellsite and shipping and logistics information for obtaining an additional quantity of the inventory item. The context model 118 can output the determination as contextual data and the computer 106 can transmit the contextual data for display on the wearable device 102. In some embodiments, if the quantity of the inventory item is not sufficient to complete the planned wellbore operation, the wearable device 102 can prompt the user to place an order for an additional quantity of the inventory item.

In some embodiments, the wearable device 102, the context model 118, and one or both of the image recognition model 114 and the NLP model 116 can be used to guide an operator through a maintenance task or any other type of task, as discussed below in reference to FIG. 6. In other embodiments, the wearable device 102, the image recognition model 114, and the context model 118 can be used to guide the user through a maintenance task. As the user is guided through the maintenance task, the wearable device 102 can transmit an image of an interior of a wellbore component. For example, the image can be an image of a pump with a cover removed such that individual components of the pump are visible. The image recognition model 114 can identify each component of the pump and output a class for each component. The classes can be input to the context model 118 and the context model 118 can output instructions for completing the maintenance task as contextual data to be transmitted to the wearable device 102 and visually displayed in the user's field of view. In some embodiments, the instructions can be transmitted to the wearable device 102 as audio instructions to be relayed to the user through an earphone of the wearable device 102. In some embodiments, the image recognition model 114 can output component identifiers for each of the individual components of the pump to be visually displayed in the user's field of view on the transparent display of the wearable device 102. Component identifiers are labels describing the individual component. For example, for the image of the pump with the cover removed to show an interior of the pump, component identifiers can be labels for washers, batteries, an engine, a liner, tubing, wiring, etc. The class labels can be overlayed on top of the user's field of view such that each component identifier is displayed over or adjacent its corresponding component.

Example Operations

Figure 2:
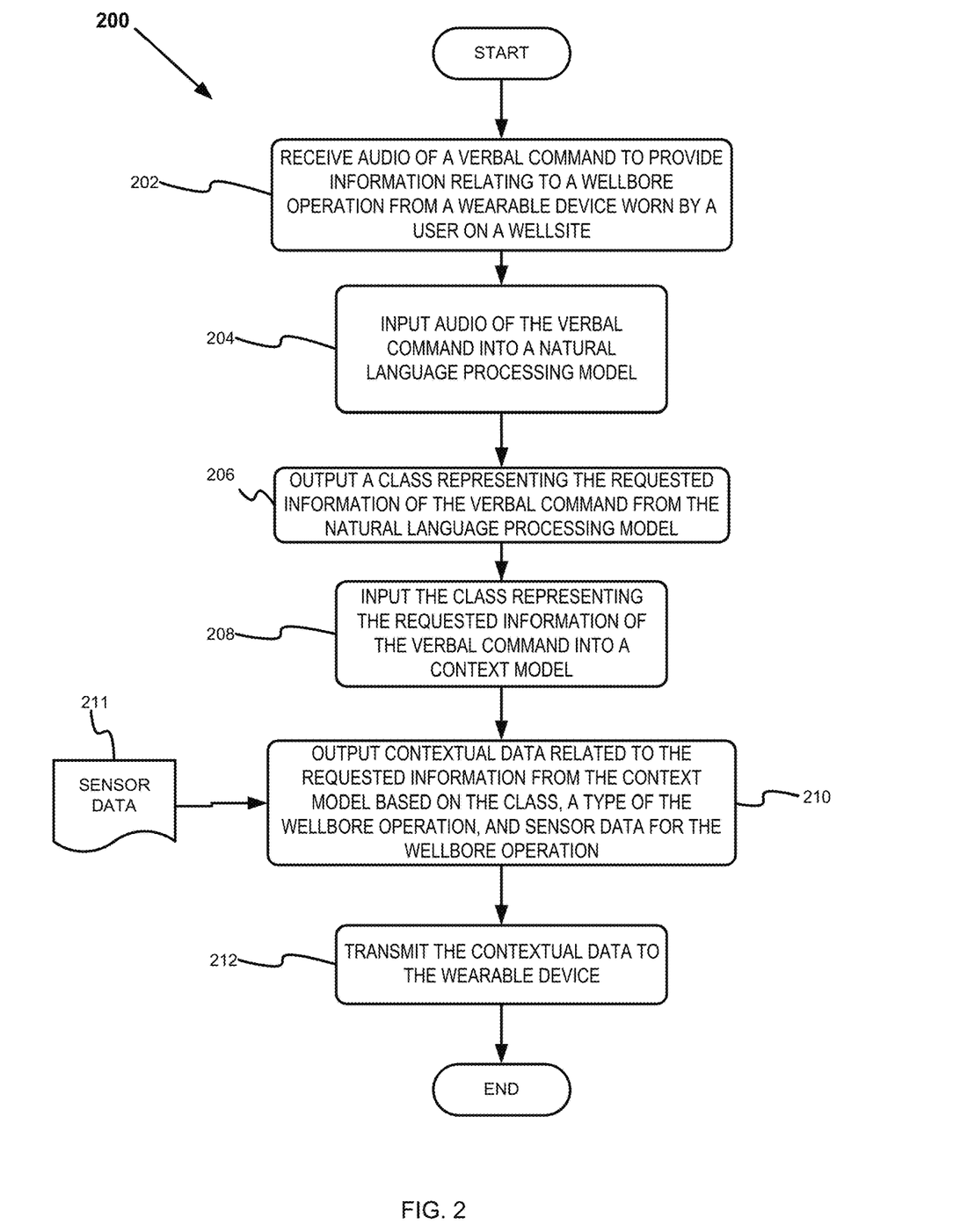
FIG. 2 depicts a flowchart of example operations for generating contextual data based on a user command from a wearable device, according to some embodiments.

FIG. 2 depicts a flowchart of example operations for generating contextual data based on a user command from a wearable device, according to some embodiments. Operations of a flowchart 200 of FIG. 2 can relate to a wearable device in a user-controlled mode that can transmit audio of a verbal command from a user to provide information related to a wellbore operation to a computer for processing. The flowchart 200 includes operations described as performed by a computer. Such operations can be performed by hardware, firmware, software, or a combination thereof. Operations of the flowchart 200 are described in reference to the example system 100 of FIG. 1. Operations of the flowchart 200 start at block 202.

At block 202, audio of a verbal command to provide information relating to a wellbore operation is received from a wearable device worn by a user on a wellsite. For example, with reference to FIG. 1, the computer 106 can receive the audio of a verbal command from the wearable device 102 via the wireless router 104. For example, the user can issue the verbal command "show me current flow and hydraulics information" through a microphone of the wearable device. The wireless router 104 can transmit the audio of the command to the computer 106 for processing.

At block 204, the audio of the verbal command is input into a natural language processing ("NLP") model. For example, with reference to FIG. 1 the audio can be input into the NLP model 116 of the computer 106. The NLP model 116 can recognize and parse speech of the audio, identify the requested information, and assign a class representing the requested information. For example, the requested information of the command "show me the current flow and hydraulic information" can be "current flow and hydraulic information[.]"

At block 206, a class representing the requested information of the verbal command is output from the NLP model. For example, with reference to FIG. 1, the NLP model 116 can output the class representing the requested information of the verbal command. For example, the NLP model 116 can output the class "hydraulics" representing the requested information "current flow and hydraulic information[.]"

At block 208, the class representing the requested information of the verbal command is input into a context model. For example, with reference to FIG. 1, the class output by the NLP model 116 can be input into the context model 118. The context model 118 can select data to provide to the user based on the class representing the requested information and contextual information about the wellbore operation.

At block 210, contextual data related to the requested information of the verbal command is output from the context model based on the class representing the requested information, a type of the wellbore operation, and sensor data 211 for the wellbore operation. For example, with reference to FIG. 1, the context model 118 can output contextual data based on the class output by the NLP model 116, a type of the wellbore operation being performed at the wellsite 122, and sensor data collected by the data acquisition system 120 from the sensors 124 and 128. For example, if the type of the wellbore operation is a cementing operation and the class representing the requested information is "hydraulics", the context model 118 can output contextual data based on pressure data collected from pressure sensors downhole. The contextual data may be one or more of an equivalent circulating density, a fracture gradient for a formation in which the wellbore operation is occurring, a pressure gradient, a flow rate, a stroke rate, etc. In some embodiments, the contextual data can be an interpretation of sensor data. For example, if pressure data of the sensor data 211 indicates a potential loss in circulation, the context model 118 can output contextual data including an alert to be relayed to the user that there may be a loss in circulation. In some embodiments, the contextual data can include suggested actions to be taken by the user based on a status of the wellbore operation. For example, if the pressure data of the sensor data 211 indicates a potential loss in circulation, the contextual data may include a suggestion to adjust the flow rate of a wellbore fluid in the wellbore.

In some embodiments, the type of the wellbore operation can be an input to the context model 118. For example, "drilling" can be input to the context model as the type of the wellbore operation. Alternatively, the context model 118 can be trained for a specific type of wellbore operation. For example, the context model 118 can compare pressure data to a library of pressure models for drilling operations. In other embodiments, the context model 118 can determine the type of the wellbore operation based on the sensor data 211. For example, if the sensor data 211 includes sensor data reflecting a rotations-per-minute for a drill string, the context model 118 can determine the type of the wellbore operation to be a drilling operation.

At block 212, the contextual data is transmitted to the wearable device. For example, with reference to FIG. 1, the computer 106 can transmit contextual data output by the context model 118 to the wearable device 102. In some embodiments, the contextual data can be displayed in the user's field of view on a transparent display of the wearable device 102. Alternatively or in addition, the contextual data can be presented as audio to the user via the wearable device 102. Operations of the flowchart 200 are complete.

Figure 3:
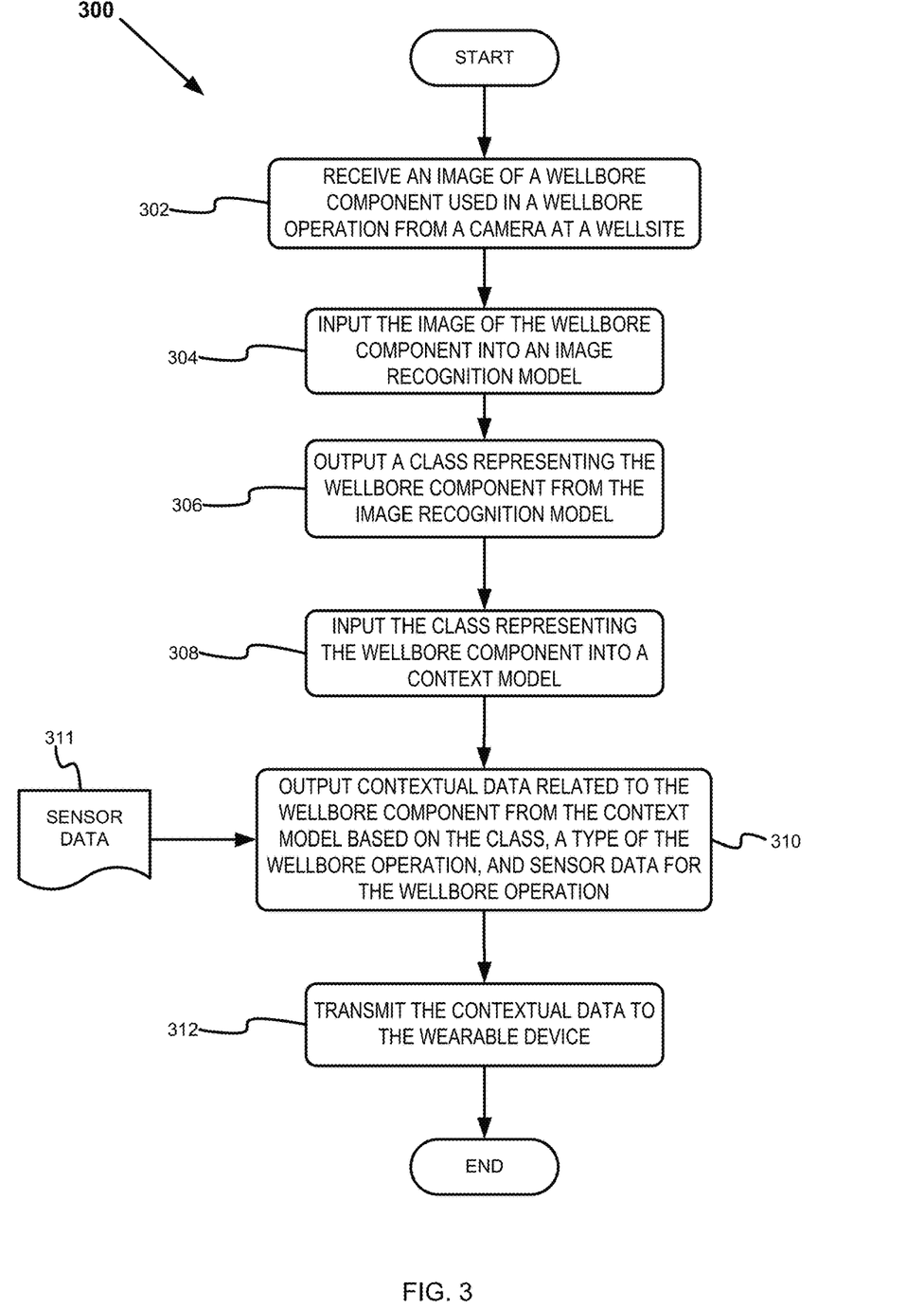
FIG. 3 depicts a flowchart of example operations for generating contextual data based on an image from a wearable device, according to some embodiments.

FIG. 3 depicts a flowchart of example operations for generating contextual data based on an image from a wearable device, according to some embodiments. Operations of a flowchart 300 of FIG. 3 can relate to a wearable device in a live mode that can transmit an image of a wellbore component used in a wellbore operation to a computer for processing. The flowchart 300 includes operations described as performed by a computer. Such operations can be performed by hardware, firmware, software, or a combination thereof. Operations of the flowchart 300 are described in reference to the example system 100 of FIG. 1. Operations of the flowchart 300 start at block 302.

At block 302, an image of a wellbore component used in a wellbore operation is received from a camera at the wellsite. In some embodiments, the image can be received from a camera of the wearable device and can be an image of a field of view of a user wearing the wearable device. For example, with reference to FIG. 1, the computer 106 can receive the image from the wearable device 102 via the wireless router 104. For example, the user can look at a top drive and the wearable device 102 can transmit an image of the top drive to the computer 106. In other embodiments, the computer can receive the image from other image capturing devices. For example, the computer can receive the image from a fixed camera at the wellsite, a drone traversing the wellsite, a mobile device such as a ruggedized tablet, etc.

At block 304, the image of the wellbore component is input into an image recognition model. For example, with reference to FIG. 1, the image of the wellbore component can be input into the image recognition model 114. For example, the image of the top drive in the user's field of view can be input into the image recognition model 114.

At block 306, a class representing the wellbore component is output from the image recognition model. For example, with reference to FIG. 1, the image recognition model 114 can output a class representing the wellbore component of the image transmitted by the wearable device 102. For example, the image recognition model 114 can output the class "top drive" representing the wellbore component that is the top drive in the image.

In some embodiments, the image recognition model 114 can compare the image of the wellbore component to a library of images of wellbore components and classify the image based on the comparison. The image recognition model 114 can then output the image classification, which can be the class of the wellbore component. The image recognition model 114 can perform object detection on the image and can include object localization and object recognition.

Multiple wellbore components can be present in the image. In some embodiments, the image recognition model 114 can output a bounding box and a class for each wellbore component of the image. In other embodiments, the image recognition model 114 can process a second image input of the user's gaze to determine where the user is looking. Alternatively, the image recognition model 114 can receive a location of the user's gaze from a gaze-tracking system of the wearable display 102. For example, if the image contains a pump, the top drive, and physical inventory and the user is looking at the top drive, the image recognition model 114 can output the class "top drive" based on the user's gaze.

Figure 4:
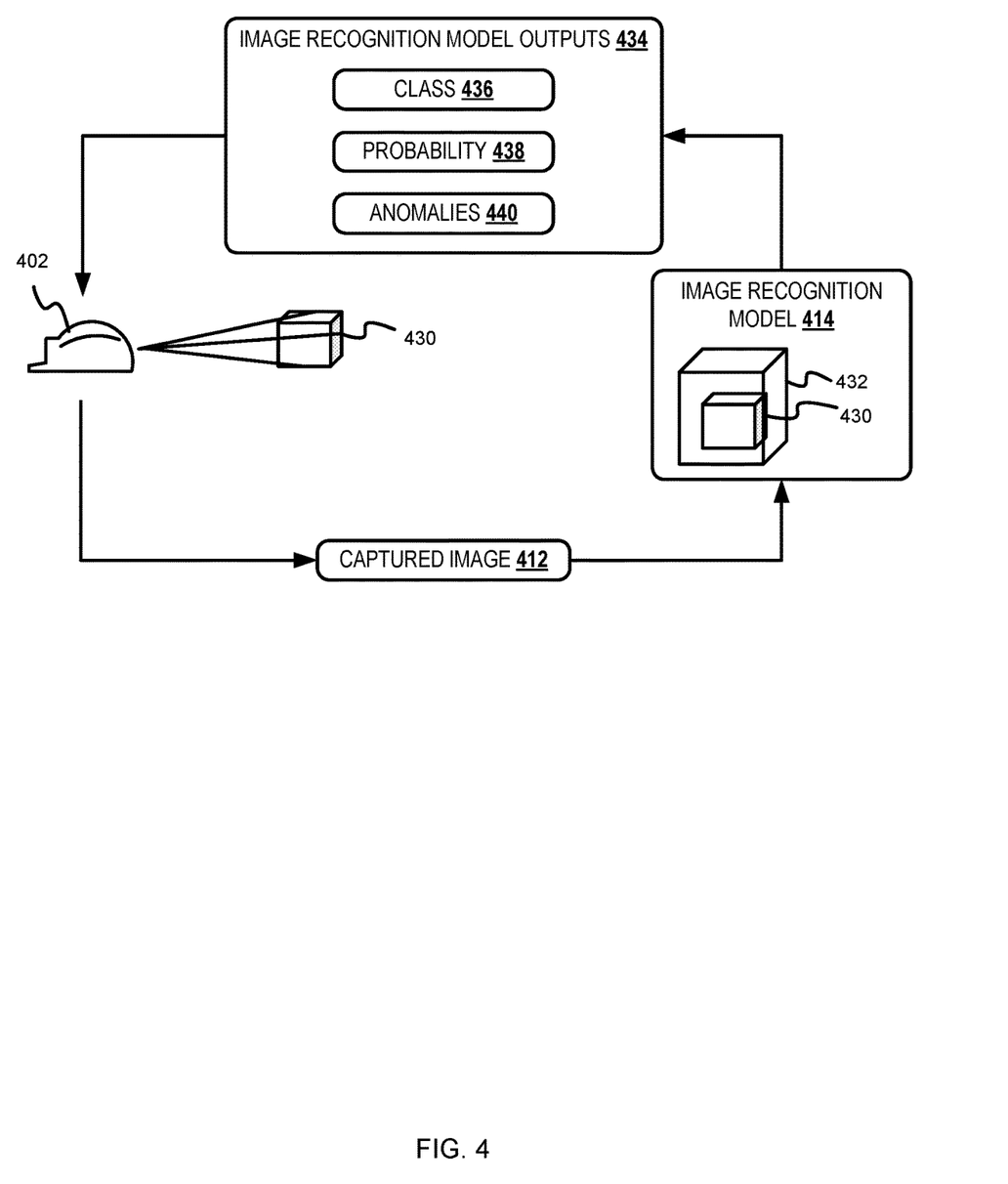
FIG. 4 depicts a block diagram illustrating example image recognition, according to some embodiments.

To help illustrate, FIG. 4 depicts a block diagram illustrating example image recognition, according to some embodiments. A user wearing a wearable device 402 can look at a wellbore component 430. An image 412 of the user's field of view can be captured by a camera of the wearable device 402, and the wearable device 402 can wirelessly transmit the captured image 412 to a computer where it is input into an image recognition model 414 for processing.

The image recognition model 414 can identify wellbore components in the captured image 412 using object detection methods. For example, the image recognition model 414 can generate a bounding box 432 describing a location of the wellbore component 430 in the captured image 412. Based on a library of images of wellbore components, the image recognition model 414 can output information relating to the wellbore component 430. Outputs 434 of the image recognition model 414 can include a class 436 representing the wellbore component 430 and a probability 438 that the class 436 representing the wellbore component 430 is accurate. In some embodiments, the image recognition model 414 can perform anomaly detection and output an anomaly notice 440 if the image recognition model 414 detects an anomaly in the captured image 412 of the wellbore component 430.

For example, if the wellbore component 430 is an assembly of a slurry pump having a liner that is washing out, the image recognition model 414 can detect an anomaly based on a comparison of the image of the slurry pump with images of slurry pumps having intact liners and output a warning that the liner is washing out as the anomaly notice 440. In some embodiments, one or more of the image recognition model outputs 434 can be transmitted to the wearable device 402 to be relayed to the user. In other embodiments, the class 436 representing the wellbore component 430 can be input into a context model to generate contextual data based on a contemporaneous wellbore operation.

Returning to operations of the flowchart 300, operations continue at block 308.

At block 308, the class representing the wellbore component is input into a context model. For example, with reference to FIG. 1, the class output by the image recognition model 114 can be input into the context model 118. The context model 118 can output contextual data that is to be transmitted to the wearable device 102 based on the class representing the wellbore component and contextual information about the wellbore operation.

At block 310, contextual data related to the wellbore component is output from the context model based on the class representing the wellbore component, a type of the wellbore operation, and sensor data 311 for the wellbore operation. For example, with reference to FIG. 1, the context model 118 can output contextual data related to the wellbore component based on the class output by the image recognition model 114, the type of the wellbore operation at the wellsite 122, and sensor data collected by the data acquisition system 120. The sensor data 311 can be sensor data from sensors at the wellsite. For example, the sensor data can be data from the sensors 124 and 128.

For example, if the type of the wellbore operation is a drilling operation and the class representing the wellbore component is "top drive", the context model 118 can output contextual data including distances to sub-surface formation tops and potential drilling hazards based on a formation model and a rotations-per-minute of a drillstring. In some embodiments, the context model 118 can output forward looking contextual data. For example, the context model 118 can determine that a drill bit of the drill string is approaching a stringer zone of the formation and that vibration in the top drive is likely to occur at the detected operating RPM and output contextual data including a recommendation to reduce the operating RPM to prevent vibration in the top drive.

At block 312, the contextual data is transmitted to the wearable device. For example, with reference to FIG. 1, the computer 106 can transmit contextual data from the context model 118 to the wearable device 102. In some embodiments, the contextual data can be displayed in the user's field of view on a transparent display of the wearable device 102. Alternatively or in addition, the contextual data can be presented as audio to the user via the wearable device 102. Operations of the flowchart 300 are complete.

Figure 5:
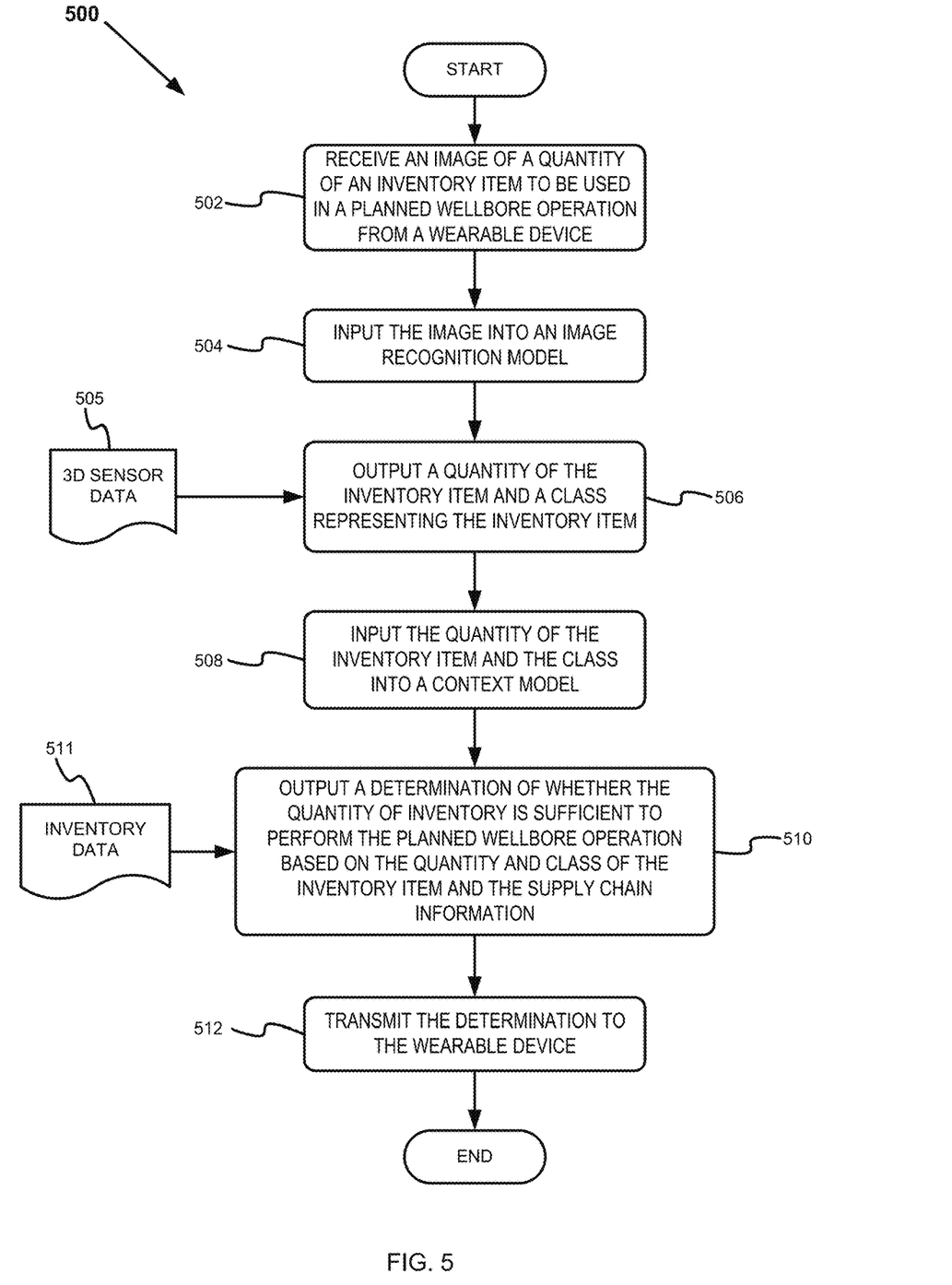
FIG. 5 depicts a flowchart of example operations for determining a quantity of inventory on-hand based on an image provided by a wearable device, according to some embodiments.

FIG. 5 depicts a flowchart of example operations for determining a quantity of inventory on-hand based on an image provided by a wearable device, according to some embodiments. Operations of a flowchart 500 of FIG. 5 can relate to a wearable device in an inventory mode that can transmit an image of a quantity of an inventory item to be used in a wellbore operation to a computer for processing. The flowchart 500 includes operations described as performed by a computer. Such operations can be performed by hardware, firmware, software, or a combination thereof. Operations of the flowchart 500 are described in reference to the example system 100 of FIG. 1. Operations of the flowchart 500 start at block 502.

At block 502, an image of a quantity of an inventory item to be used in a planned wellbore operation is received from a wearable device. For example, with reference to FIG. 1, the computer 106 can receive an image of a quantity of an inventory item to be used in a planned wellbore operation from the wearable device 102. For example, a user can look at sacks of barite on a pallet and the wearable device 102 can transmit an image of the sacks of barite to the computer 106.

At block 504, the image of the quantity of the inventory item is input into an image recognition model. For example, with reference to FIG. 1, the image of the quantity of the inventory item can be input into the image recognition model 114. For example, the image of the sacks of barite can be input into the image recognition model 114.

At block 506, a quantity of the inventory item and a class representing the inventory item are output from the image recognition model. For example, with reference to FIG. 1, the image recognition model 114 can output a quantity of the inventory item and a class representing the inventory item. The image recognition model 114 can identify the inventory item and output a class representing the inventory item of the quantity of the inventory item. For example, the image recognition model 114 can identify the inventory item to be barite sacks and output the class "barite" to represent the inventory item of the barite sacks.

The wearable device can include depth sensors, ultrasonic sensors, LIDAR sensors, or other sensors for 3D image capturing. For example, with reference to FIG. 1, the wearable device 102 can include 3D sensors and can transmit data from the 3D sensors to the image recognition model 114. The image recognition model 114 can volumetrically assess the image using 3D sensor data 505 from the wearable device to determine and output the quantity of the inventory in the image. For example, the image recognition model 114 can output the number of sacks of barite on the pallet in the image.

At block 508, the quantity of the inventory item and the class representing the inventory item are input into a context model. For example, with reference to FIG. 1, the quantity of the inventory item and the class representing the inventory item output by the image recognition model 114 can be input into the context model 118. The context model 118 can select data to relay to the user based on the class of the inventory item, the quantity of the inventory item, and contextual information about the planned wellbore operation.

At block 510, a determination of whether the quantity of the inventory item is sufficient to perform the planned wellbore operation is output from the context model based on the quantity of the inventory item and inventory data 511. For example, with reference to FIG. 1, the context model 118 can output a determination that there is not a sufficient quantity of the inventory item to perform the planned wellbore operation. For example, if the planned wellbore operation requires 200 sacks of barite, the quantity of the barite sacks output by the image recognition model is 100 sacks, and the inventory data 511 indicates there are 50 sacks of barite in storage, the determination would be that the quantity of the barite sacks is insufficient to perform the planned wellbore operation.

At block 512, the determination is transmitted to the wearable device. For example, with reference to FIG. 1, the computer 106 can transmit the determination that there is not a sufficient quantity of the inventory item to complete a planned wellbore operation to the wearable device 102. In some embodiments, the determination can be displayed in the user's field of vision on a transparent display of the wearable device 102. In other embodiments, the determination can be presented as audio to the user via a speaker of the wearable device 102. Operations of the flowchart 500 are complete.

Figure 6:
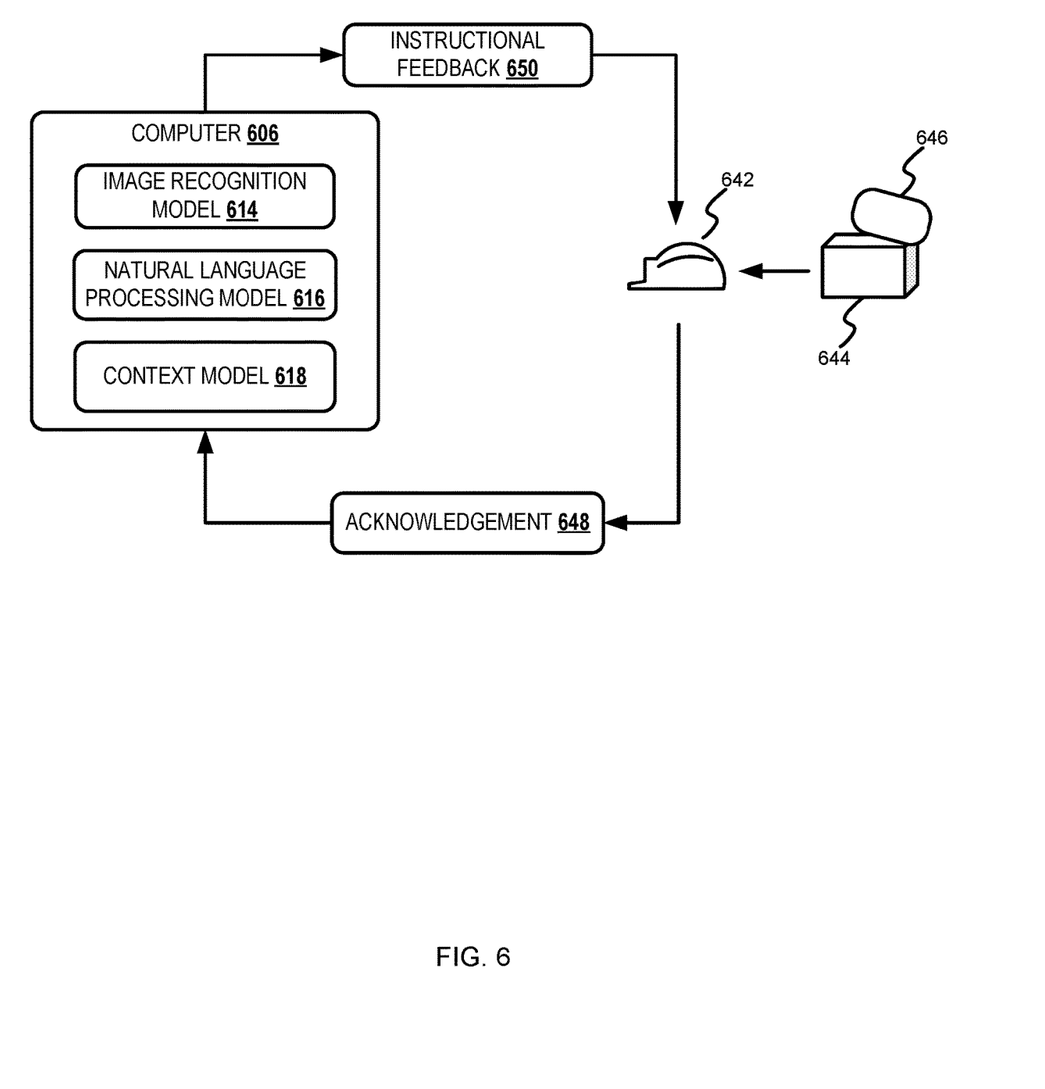
FIG. 6 depicts a block diagram illustrating example operations for guiding an operator through a maintenance task using a wearable device, according to some embodiments.

FIG. 6 depicts a block diagram illustrating example operations for guiding an operator through a maintenance task using a wearable device, according to some embodiments. An operator performing a maintenance task on a piece of wellbore equipment 644 can be guided through each step of the maintenance task using a wearable device 642. The wearable device 642 can include a camera oriented to capture the operator's field of view, a microphone, and a transparent display in the operator's field of view.

Instructional text 646 for performing a step of the maintenance task on the wellbore equipment 644 can be overlayed on the operator's field of view and displayed on the transparent display of the wearable device 642. Once the operator has completed the displayed step, the wearable device 642 can transmit a verbal acknowledgement 648 from the operator to a computer 606. In some embodiments, the operator can verbally acknowledge the step using the microphone of the wearable device 642. Audio of the verbal acknowledgement 648 can be transmitted to the computer 606 and processed by a natural language processing model 616 to output a determination of whether the operator has confirmed the step has been acknowledged. The determination can then be input into a context model 618 to generate instructional feedback 650 to be transmitted to the wearable device 642.

In other embodiments, the operator can look at a component of the wellbore equipment 644 or at the instructional text 646 to confirm they have acknowledged the step. The wearable device 642 can include a second camera oriented to capture images of the operator's gaze. Images of the user's gaze can be transmitted to the computer 606 and processed by an image recognition model 614 to output a determination of whether the operator's gaze has indicated they have acknowledged the step described by the instructional text 646. The determination can then be input into the context model 618 to generate the instructional feedback 650 to be transmitted to the wearable device 642.

In some embodiments, the instructional feedback 650 can be visually displayed to the operator via the transparent display of the wearable device 642. For example, the instructional feedback 650 can be displayed by updating the instructional text 646 with new text. Alternatively or in addition, the instructional feedback 650 can be visually displayed in the operator's field of view as an image or a hologram. In other embodiments, the instructional feedback 650 can be an audio instruction relayed to the user via a speaker of the wearable device 642. Once the instructional feedback 650 has been acknowledged by the user, through audio or gaze, the context model 618 can output additional instructional feedback 650 until the entirety of the maintenance task has been completed.

The flowcharts are provided to aid in understanding the illustrations and are not to be used to limit scope of the claims. The flowcharts depict example operations that can vary within the scope of the claims. Additional operations may be performed or fewer operations may be performed. With respect to FIG. 3, the image recognition model may output a bounding box associated with an image of the user's gaze and the context model may perform the step of determining what the user is looking at based on the bounding box associated with the image of the user's gaze and the bounding boxes associated with the image of the wellbore components. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for image processing using an image recognition model and a context model as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each class, unless specifically stated otherwise. A clause that recites "at least one of A, B, and C" can be infringed with only one of the listed items, multiple of the listed items, and one or more of the items in the list and another item not listed.

Example Wellbore Operations

Figures 7A, 7B:
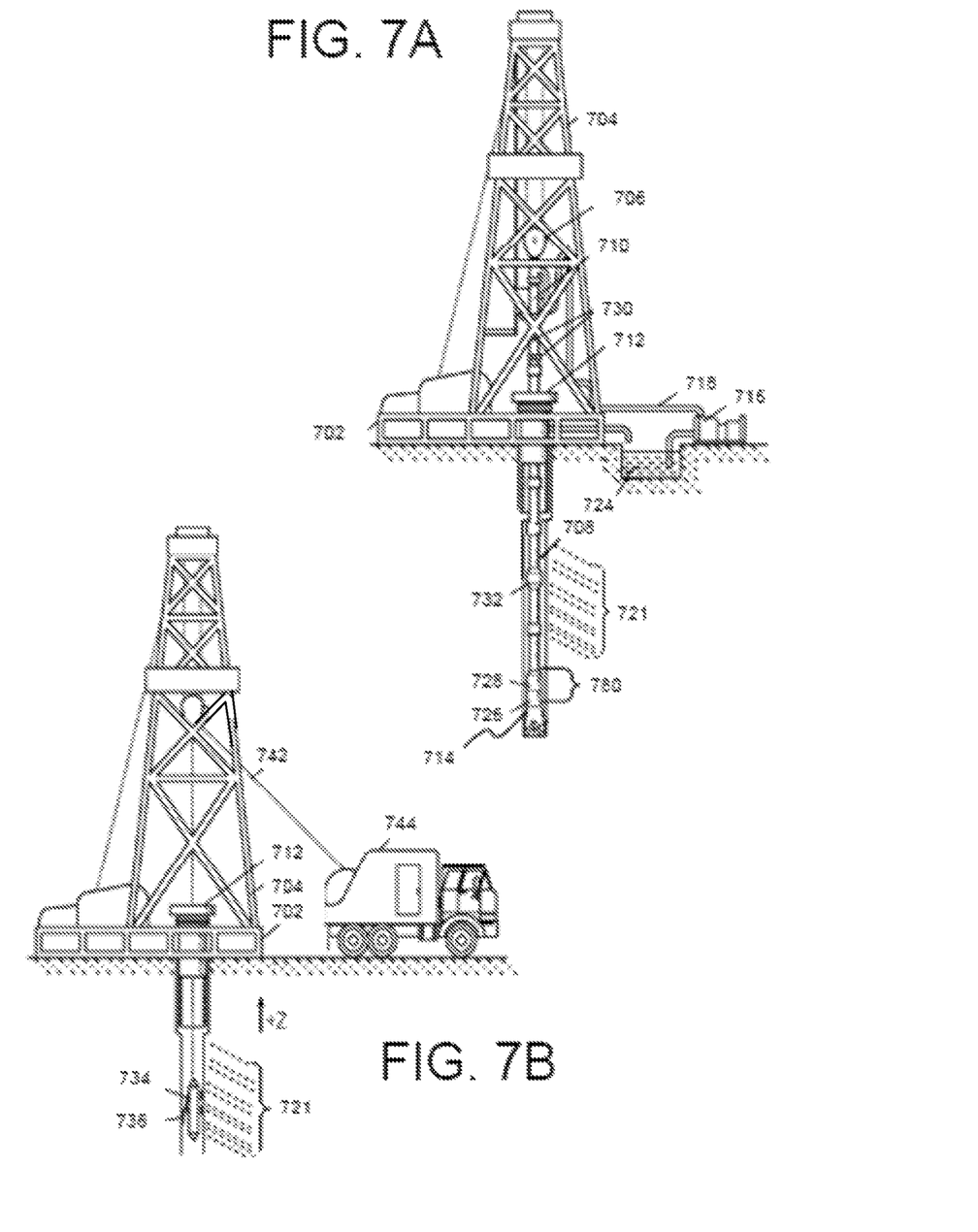
FIG. 7A depicts a schematic diagram of an example drilling system, according to some embodiments.
FIG. 7B depicts a schematic diagram of an example wireline system, according to some embodiments.

FIGS. 7A-7B depict two example wellbore operations—drilling and wireline. However, example embodiments can be used in any other type of wellbore operation (e.g., fracturing, cementing, etc.). FIG. 7A depicts an example drilling system, according to some embodiments. A drilling platform 702 can support a derrick 704 having a traveling block 706 for raising and lowering a drill string 708. A top drive 710 can support and rotate the drill string 708 as the string is lowered through a well head 712. The drill string's rotation (and/or a downhole motor) can drive a drill bit 714 to extend a borehole through a subsurface earth formation 721. Mud recirculation equipment 716 can draw drilling fluid from a retention pit 724 and pump it through a feed pipe 718 to the top drive 710, through an interior of the drill string 708 to the drill bit 714, through orifices in drill bit, through the annulus around drill string 708 to a blowout preventer at the surface, and through a discharge pipe into the pit 724. The drilling fluid can transport cuttings from the borehole into the pit 724 and aid in maintaining the borehole integrity.

One or more logging tools 726 can be integrated into a bottom hole assembly 780 near the bit 714. Suitable logging tools can include formation fluid sampling tools, acoustic logging tools, electromagnetic resistivity tools, and nuclear magnetic resonance tools, among others. Logging while drilling tools usually take the form of a drill collar, i.e., a thick-walled tubular that provides weight and rigidity to aid the drilling process. As the bit 714 extends the borehole through the formations, the logging tool(s) 726 can collect measurements of formation characteristics. Other tools and sensors can also be included in the bottom hole assembly 780 to gather measurements of various drilling parameters such as position, orientation, weight-on-bit, borehole diameter, etc. A control/telemetry module 728 can collect data from the various bottom hole assembly instruments (including position and orientation information) and transmitted to a computer for processing. For example, with reference to FIG. 1, the data acquisition system 120 can include the logging tools 726 and/or the control/telemetry module 728. Selected portions of the data can be communicated to surface receivers 730 by, e.g., mud pulse telemetry. Other logging-while drilling telemetry methods also exist and could be employed. For example, electromagnetic telemetry or through-wall acoustic telemetry can be employed with an optional repeater 732 to extend the telemetry range. As another example, the drill string 708 could be formed from wired drill pipe that enables waveforms or images to be transmitted to the surface in real time to enable quality control and processing to optimize the logging resolution. Most telemetry systems also enable commands to be communicated from the surface to the control and telemetry module to configure the operation of the tools.

FIG. 7B depicts an example wireline system, according to some embodiments. At various times during a drilling process, the drill string 708 may be removed from the borehole for wireline logging operations. Once the drill string 708 has been removed, logging operations can be conducted. A logging tool 734 can be suspended by a cable 742. The cable 742 may or may not have conductors for transporting power to the tool and telemetry from the tool to the surface. The logging tool 734 may have pads 736 and/or centralizing springs to maintain the tool near an axis of the borehole as the logging tool 734 is pulled uphole. The logging tool 734 can include pressure sensors, flowmeters, densitometers, etc., as described herein. For example, with reference to FIG. 1, the downhole sensors 128 can include sensors of the logging tool. Returning to FIG. 7B, logging facility 744 can collect measurements from the logging tool 734 and can include a computer system for processing and storing the measurements gathered by the logging tool 734. For example, with reference to FIG. 1, the logging facility can include the data acquisition system 120.

EXAMPLE EMBODIMENTS

Embodiment 1: A method comprising receiving an image that includes a wellbore component used during a wellbore operation of a borehole at a wellsite captured by a camera at the wellsite; inputting the image into an image recognition model; outputting, from the image recognition model, a class representing the wellbore component; inputting the class into a context model; outputting, from the context model, contextual data related to the wellbore component based on, the class representing the wellbore component, contextual data relating to the wellbore operation, and a type of the wellbore operation; and transmitting the contextual data to a wearable device worn by a user at the wellsite.

Embodiment 2: The method of Embodiment 1, wherein the camera at the wellsite is one of a camera of the wearable device, a camera of a drone, a camera of a mobile device, and a camera at a fixed location at the wellsite.

Embodiment 3: The method of Embodiments 1 or 2, wherein the contextual data relating to the wellbore operation comprises data, detected during the wellbore operation, from at least one sensor positioned at a location that comprises at least one of a location at the wellbore site and a location in the borehole.

Embodiment 4: The method of any one of Embodiments 1-3, further comprising presenting the contextual data to the user, wherein presenting the contextual data to the user comprises at least one of visually displaying the contextual data on a transparent display of the wearable device and outputting audio from a speaker of the wearable device.

Embodiment 5: The method of any one of Embodiments 1-4, wherein the wellbore component is wellbore equipment, wherein the class representing the wellbore component is a type of the wellbore equipment.

Embodiment 6: The method of any one of Embodiments 1-4, wherein the wellbore component is an inventory item usable during the wellbore operation, wherein the image that includes the wellbore component comprises a plurality of the inventory item, wherein the method comprises outputting, from the image recognition model, a quantity of the wellbore component; and inputting the quantity of the wellbore component into the context model.

Embodiment 7: The method of Embodiment 6, wherein the wellbore operation is a planned wellbore operation, wherein the contextual information relating to the wellbore operation comprises inventory data for the inventory item, wherein the contextual data comprises a determination of whether there is a sufficient quantity of the inventory item to perform the planned wellbore operation.

Embodiment 8: A system comprising a wearable device to be worn by a user at a wellsite, the wearable device comprising, a camera to capture an image that includes a wellbore component at the wellsite used during a wellbore operation in a borehole; a transceiver; and a transparent display; and a computer communicatively coupled to the wearable device, wherein the computer comprises, a computer processor; and a computer non-transitory, machine-readable media having instructions stored thereon that are executable by the computer processor to perform computer operations comprising receiving, from the transceiver, the image that includes the wellbore component; inputting the image into an image recognition model; outputting, from the image recognition model, a class representing the wellbore component; inputting the class representing the wellbore component into a context model; outputting, from the context model, contextual data related to the wellbore component based on, the class representing the wellbore component, contextual data relating to the wellbore operation, and a type of the wellbore operation; and transmitting the contextual data to the wearable device.

Embodiment 9: The system of Embodiment 8, wherein the wearable device comprises a device processor; and a device non-transitory, machine-readable media having instructions stored thereon that are executable by the device processor to perform device operations comprising presenting the contextual data at the wearable device, in response to receipt of the contextual data, wherein presenting the contextual data comprises at least one of outputting the contextual data on the transparent display, and outputting audio from a speaker of the wearable device.

Embodiment 10: The system of Embodiment 9, wherein the wearable device is operable in a plurality of operating modes, the operating modes comprising at least one of a user-controlled mode, wherein the device operations comprise transmitting, from the transceiver, audio of a verbal command to provide information relating to the wellbore operation to the computer non-transitory machine-readable media; and a live mode, wherein the device operations comprise capturing the image using the camera; and transmitting, from the transceiver the image to the computer non-transitory machine-readable media, wherein the image is of a field of view of the user.

Embodiment 11: The system of any one of Embodiments 8-10, wherein the contextual data relating to the wellbore operation comprises data, detected during the wellbore operation, from at least one sensor positioned at a location that comprises at least one of a location at the wellbore site and a location in the borehole.

Embodiment 12: The system of any one of Embodiments 8-11, wherein the wellbore component is an inventory item, wherein the image that includes the wellbore component comprises a plurality of the inventory item, wherein the computer operations comprise outputting, from the image recognition model, a quantity of the wellbore component; and inputting the quantity of the wellbore component into the context model.

Embodiment 13: The system of Embodiment 12, wherein the wellbore operation is a planned wellbore operation, wherein the contextual information relating to the wellbore operation comprises inventory data for the inventory item, wherein the contextual data comprises a determination of whether there is a sufficient quantity of the inventory item to perform the planned wellbore operation.

Embodiment 14: The system of any one of Embodiments 8 and 10-13, wherein the wearable device comprises a device processor; and a device non-transitory, machine-readable media having instructions stored thereon that are executable by the device processor to perform device operations comprising detecting a portion of the image where the user is gazing based on eyes of the user; and transmitting an identification of the portion of the image to the computer, wherein the computer operations comprise inputting the identification of the portion of the image into the image recognition model, and wherein outputting, from the image recognition model, the class representing the wellbore component comprises outputting, from the image recognition model, the class based on the identification of the portion of the image.

Embodiment 15: A non-transitory, machine-readable media having instructions stored thereon that are executable by a computer to perform operations comprising receiving, from a camera at a wellsite, an image that includes a wellbore component used during a wellbore operation; inputting the image into an image recognition model; outputting, from the image recognition model, a class representing the wellbore component; inputting the class representing the wellbore component into a context model; outputting, from the context model, contextual data related to the wellbore component based on, the class representing the wellbore component, at least one of sensor data collected during the wellbore operation and inventory data, and a type of the wellbore operation; and transmitting the contextual data to a wearable device worn by a user at the wellsite.

Embodiment 16: The non-transitory, machine-readable media of Embodiment 15, wherein the wellbore component is wellbore equipment, wherein the class representing the wellbore component is a type of the wellbore equipment.

Embodiment 17: The non-transitory, machine-readable media of Embodiments 15 or 16, wherein the contextual data relating to the wellbore operation comprises data, detected during the wellbore operation, from at least one sensor positioned at a location that comprises at least one of a location at the wellbore site and a location in the borehole Embodiment 18: The non-transitory, machine-readable media of Embodiments 15 or 17, wherein the wellbore component is an inventory item, wherein the image that includes the wellbore component comprises a plurality of the inventory item, wherein the operations comprise outputting, from the image recognition model, a quantity of the wellbore component; and inputting the quantity of the wellbore component into the context model.

Embodiment 19: The non-transitory, machine-readable media of Embodiment 18, wherein the wellbore operation is a planned wellbore operation, wherein the contextual information relating to the wellbore operation comprises inventory data for the inventory item, wherein the contextual data comprises a determination of whether there is a sufficient quantity of the inventory item to perform the planned wellbore operation.

Embodiment 20: The non-transitory, machine-readable media of any one of Embodiments 15-19, wherein the operations further comprise receiving an identification of a portion of the image where the user is gazing; and inputting the identification of the portion of the image into the image recognition model, and wherein outputting, from the image recognition model, the class representing the wellbore component comprises outputting, from the image recognition model, the class based on the identification of the portion of the image.

What is claimed is:

1. A method comprising:
receiving voice data about a wellbore component and an image that includes the wellbore component used during a wellbore operation of a borehole at a wellsite captured by an audio input device and a camera at the wellsite;
inputting the image into an image recognition model and the voice data into a natural language processing model;
outputting, from the image recognition model and the natural language processing model, one or more classes representing the wellbore component;
inputting the one or more classes into a context model;
outputting, from the context model, contextual data related to the wellbore component based on,
the one or more classes representing the wellbore component, contextual data relating to the wellbore operation, and
a type of the wellbore operation; and
transmitting the contextual data related to the wellbore component to a wearable device worn by a user at the wellsite.

2. The method of claim 1, wherein the camera and audio input device at the wellsite is one of a camera and audio input device of the wearable device, a camera and audio input device of a drone, a camera and audio input device of a mobile device, and a camera and audio input device at a fixed location at the wellsite.

3. The method of claim 1, wherein the contextual data relating to the wellbore operation comprises data, detected during the wellbore operation, from at least one sensor positioned at a location that comprises at least one of a location at the wellsite or a location in the borehole.

4. The method of claim 1, wherein the wellbore component is wellbore equipment, wherein the one or more classes representing the wellbore component is a type of the wellbore equipment.

5. The method of claim 1, further comprising presenting the contextual data to the user, wherein presenting the contextual data to the user comprises at least one of:
visually displaying the contextual data on a transparent display of the wearable device and
outputting audio from a speaker of the wearable device.

6. The method of claim 1, wherein the wellbore component is an inventory item usable during the wellbore operation, wherein the image that includes the wellbore component and the voice data about the wellbore component comprise a plurality of the inventory item, wherein the method comprises:
outputting, from the image recognition model and the natural voice processing model, a quantity of the wellbore component; and
inputting the quantity of the wellbore component into the context model.

7. The method of claim 6, wherein the wellbore operation is a planned wellbore operation, wherein the contextual data relating to the wellbore operation comprises inventory data for the inventory item, wherein the contextual data comprises a determination of whether there is a sufficient quantity of the inventory item to perform the planned wellbore operation.

8. A system comprising:
a wearable device to be worn by a user at a wellsite, the wearable device comprising,
a camera to capture an image that includes a wellbore component at the wellsite used during a wellbore operation in a borehole;
an audio input device to capture voice data about the wellbore component
a transceiver; and
a transparent display; and
a computer communicatively coupled to the wearable device, wherein the computer comprises,
a computer processor; and
a computer non-transitory, machine-readable media having instructions stored thereon that are executable by the computer processor to perform computer operations comprising:
receiving, from the transceiver, the image that includes the wellbore component and voice data about the wellbore component;
inputting the image into an image recognition model and the voice data into a natural language processing model;
outputting, from the image recognition model and the natural language processing model, one or more classes representing the wellbore component;
inputting the one or more classes representing the wellbore component into a context model;
outputting, from the context model, contextual data related to the wellbore component based on,
the one or more classes representing the wellbore component,
contextual data relating to the wellbore operation, and
a type of the wellbore operation; and
transmitting the contextual data to the wearable device.

9. The system of claim 8, wherein the wearable device comprises:
a device processor; and
a device non-transitory, machine-readable media having instructions stored thereon that are executable by the device processor to perform device operations comprising:
presenting the contextual data at the wearable device, in response to receipt of the contextual data, wherein presenting the contextual data comprises at least one of
outputting the contextual data on the transparent display, and
outputting audio from a speaker of the wearable device.

10. The system of claim 9, wherein the wearable device is operable in a plurality of operating modes, the operating modes comprising at least one of:
a user-controlled mode, wherein the device operations comprise transmitting, from the transceiver, the voice data to provide information relating to the wellbore operation to the device non-transitory machine-readable media; and
a live mode, wherein the device operations comprise:
capturing the image using the camera; and
transmitting, from the transceiver the image to the computer non-transitory machine-readable media, wherein the image is of a field of view of the user.

11. The system of claim 8, wherein the contextual data relating to the wellbore operation comprises data, detected during the wellbore operation, from at least one sensor positioned at a location that comprises at least one of a location at the wellsite and a location in the borehole.

12. The system of claim 8,
wherein the wellbore component is an inventory item, wherein the image that includes the wellbore component and the voice data about the wellbore component comprise a plurality of the inventory item,
wherein the computer operations comprise:
outputting, from the image recognition model and the natural language processing model, a quantity of the wellbore component; and
inputting the quantity of the wellbore component into the context model.

13. The system of claim 12, wherein the wellbore operation is a planned wellbore operation, wherein the contextual data relating to the wellbore operation comprises inventory data for the inventory item, wherein the contextual data comprises a determination of whether there is a sufficient quantity of the inventory item to perform the planned wellbore operation.

14. The system of claim 8,
wherein the wearable device comprises:
a device processor; and
a device non-transitory, machine-readable media having instructions stored thereon that are executable by the device processor to perform device operations comprising:
detecting a portion of the image where the user is gazing based on eyes of the user; and
transmitting an identification of the portion of the image to the computer,
detecting voice data from an audio input device; and
transmitting an identification of the voice data to the computer,
wherein the computer operations comprise,
inputting the identification of the portion of the image into the image recognition model and the identification of the voice data into the natural language processing model, and
wherein outputting, from the image recognition model and the natural language processing model, the one or more classes representing the wellbore component comprises outputting, from the image recognition model and the natural language processing model, the one or more classes based on the identification of the portion of the image and the identification of the voice data.

15. A non-transitory, machine-readable media having instructions stored thereon that are executable by a computer to perform operations comprising:
receiving, from a camera at a wellsite, an image that includes a wellbore component and, from an audio input device, voice data about a wellbore component used during a wellbore operation;
inputting the image into an image recognition model and the voice data into a natural language processing model;
outputting, from the image recognition model and the natural language processing model, one or more classes representing the wellbore component;
inputting the one or more classes representing the wellbore component into a context model;
outputting, from the context model, contextual data related to the wellbore component based on,
the one or more classes representing the wellbore component,
at least one of sensor data collected during the wellbore operation and inventory data, and
a type of the wellbore operation; and
transmitting the contextual data to a wearable device worn by a user at the wellsite.

16. The non-transitory, machine-readable media of claim 15, wherein the wellbore component is wellbore equipment, wherein the one or more classes representing the wellbore component is a type of the wellbore equipment.

17. The non-transitory, machine-readable media of claim 15, wherein the contextual data relating to the wellbore operation comprises data, detected during the wellbore operation, from at least one sensor positioned at a location that comprises at least one of a location at the wellbore site and a location in the wellsite.

18. The non-transitory, machine-readable media of claim 15, wherein the wellbore component is an inventory item, wherein the image that includes the wellbore component and the voice data about the wellbore component comprise a plurality of the inventory item, wherein the operations comprise:
outputting, from the image recognition model and the natural language processing model, a quantity of the wellbore component; and
inputting the quantity of the wellbore component into the context model.

19. The non-transitory, machine-readable media of claim 18, wherein the wellbore operation is a planned wellbore operation, wherein the contextual information relating to the wellbore operation comprises inventory data for the inventory item, wherein the contextual data comprises a determination of whether there is a sufficient quantity of the inventory item to perform the planned wellbore operation.

20. The non-transitory, machine-readable media of claim 15, wherein the operations further comprise:
receiving an identification of a portion of the image where the user is gazing; and
inputting the identification of the portion of the image into the image recognition model, receiving an identification of voice data based on the input of an audio input device; and
inputting the identification of the voice data into the natural language processing model; and
wherein outputting, from the image recognition model and the natural language processing model, the one or more classes representing the wellbore component comprises outputting, from the image recognition model and the natural language processing model, the one or more classes based on the identification of the portion of the image and the voice data.

* * * * *